May 2, 1950
O. JACOBSEN
2,505,971
MECHANICAL LIFT PLUG VALVE
Filed Jan. 26, 1945
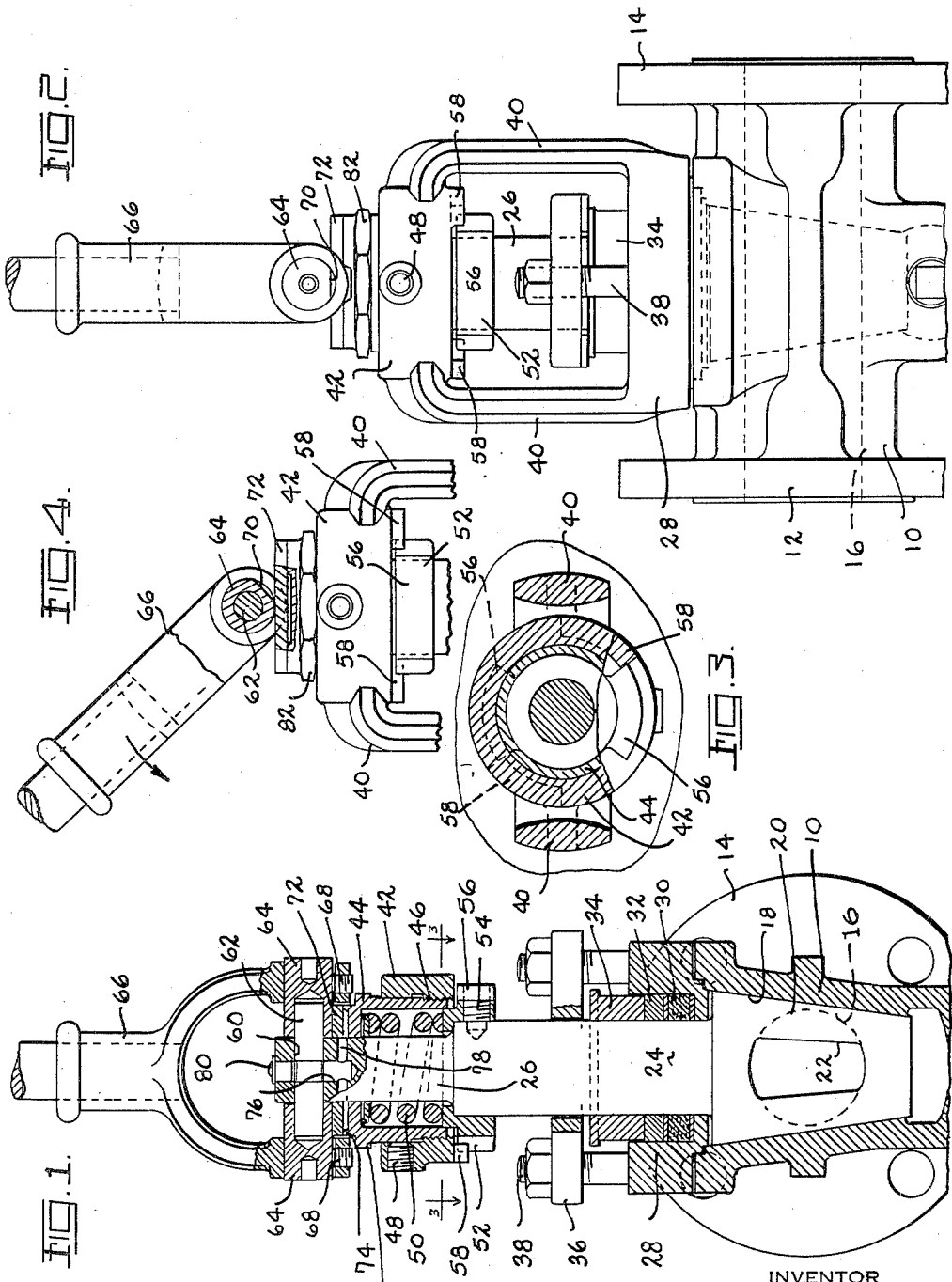
INVENTOR
OYSTEIN JACOBSEN,
BY
Toulmin & Toulmin
ATTORNEYS Patented May 2, 1950

2,505,971

UNITED STATES PATENT OFFICE 2,505,971

MECHANICAL LIFT PLUG VALVE

Oystein Jacobsen, Montgomery County, Ohio, assignor to The Duriron Company, Inc., Dayton, Ohio, a corporation of New York Application January 26, 1945, Serial No. 574,687

3 Claims. (Cl. 251—97)

This invention relates to valves for controlling the flow of fluids and is particularly concerned with mechanical lift plug cock valves.

Plug cock valves are satisfactorily employed in small installations but when such a valve is used for controlling large quantities of fluids, the size of the valve parts necessary to accommodate the said quantities creates operating difficulties in the turning of the plug from one position to another. The plug, having a large area in contact with the valve body, has a tendency to stick and, furthermore, friction is produced by the relative movement of the plug and valve body. Also, various corrosive fluids may be handled by the valve in which case certain chemical compounds are generated or precipitated within the valve which tend to make difficult the turning of the plug.

While various methods have been proposed for loosening the valve plug in order to facilitate its rotation, most of these expedients employ grease or oil by means of which pressure can be applied to the bottom surface of the plug. Such an arrangement has the disadvantage of permitting the grease or oil to escape from between the plug and valve body if they are not perfectly fitted and, furthermore, require apparatus capable of developing the necessary pressures on the grease when it is desired to loosen the plug.

Another arrangement is that which loosens the plug in the valve body by mechanically lifting it from its seat during the rotational movement thereof and thereafter permits the plug to be returned into sealing relationship with the said seat. The return movement of the plug into its seat may be effected by mechanical means or by a suitable yielding means such as a spring. For most classes of service a spring is preferable because it exerts a downward thrust on the plug throughout a considerable distance thereby reducing the necessity for frequent adjustment.

Accordingly, the primary object of this invention is to provide a lifting structure for the plug of a plug cock valve which facilitates the turning thereof.

It is another object to provide an improved plug cock valve in which the plug can be lifted mechanically and depressed by a spring during the turning of the valve from its off to its on position or vice versa.

It is another object to provide a single means for lifting the plug cock from its seat and also for turning it from one position to another.

It is another object to provide in a plug valve according to the foregoing object, a stop means which automatically positions the valve in either its full on or full off position.

These and other objects and advantages will become more apparent upon reference to the accompanying drawing, in which:

Figure 1 is a vertical section through a valve constructed according to this invention;

Figure 2 is a side elevation of the valve of Figure 1;

Figure 3 is a plan section over the stop mechanism of the valve and is indicated by the line 3—3 on Figure 1; and Figure 4 is a fragmentary view of the valve showing it with the lifting mechanism in action.

Referring more particularly to the drawing, the valve of this invention may be seen to comprise a valve body 10 which has the flanges 12 and 14 on the ends thereof and a passage 16 therethrough. The passage 16 is intersected by a substantially vertical conical bore 18 which receives the valve plug 20. The valve plug 20 has a passage 22 therein which may be turned into alignment with the passage 16 for permitting fluids to pass through the valve.

The plug 20 is a substantially conically shaped member adapted to fit within the bore 18 and has extending upwardly therefrom the valve stem 24 which has the reduced diameter upper portion 26. The valve plug is maintained in position by a plate 28 which is suitably retained on the valve body 10 by bolts (not shown) and which comprises a recess 30 adapted for receiving the packing 32 which is pressed into position by a gland 34. The gland 34 is urged downwardly by a plate 36 which is maintained in position by the bolts 38 which extend into the plate 28.

The plate 28 has a pair of oppositely disposed and upwardly extending arms 40 which terminate in a hub 42 adapted for receiving the cup 44. The cup 44 is threaded into the hub 42 as at 46 and is locked in position by a set screw 48. The cup 44 is hollow and has therein a compression spring 50 which bears between the upper end of the said cup and a collar 52 on the stem 24. The collar 52 has a shouldered bore therein so as to engage the shoulder of the valve stem between the portions 24 and 26 and is further provided with a set screw 54 which locks it in position relative to the valve stem.

The collar 52 likewise comprises the opposed lugs 56 which are adapted for engagement with the depending lugs 58 on the hub 52. The lugs 56 and 58 are so positioned that the latter are abutted by the former when the valve is in its full on and full off positions.

The upper end of the portion 26 of the valve stem has a transverse bore 60 therein which receives a pin 62. The pin 62 carries on either end thereof a cam member 64, such cam member being received in apertures in the bifurcated ends of a lever 66 and being locked in position by the set screws 68.

Reference to Figures 2 and 4 will show that the members 64 comprise the flat portions 70 which, when the lever is in its Figure 2 position, bear against a washer 72 which, in turn, abuts an annular flange 74 on the top of the cup member 44. It will be apparent that as the lever 66 is moved from its Figure 2 position into its Figure 4 position, the member 64 will act as a cam and lift the pin 62 and, therefore, the valve stem and valve plug so that the valve plug is broken loose from its seat and thus may readily be rotated from one position to another. At the same time, the lever 66 moves into position to provide a relatively long lever arm and thus to provide the mechanical advantage necessary to rotate the valve plug. When the valve is in its Figure 2 position, the lever 66 is substantially vertical and is, therefore, conveniently located so that it does not extend outwardly over the limits of the valve body.

For the purpose of facilitating the moving of the lever 66 and the rotating of the valve plug, there is provided a vertical bore 76 in the upper end of the portion 26 which communicates by means of a transverse bore 78 with the space between the washer 72 and the upper end of the cup 44. By means of a lubricant fitting 80 in the upper end of the bore 76, lubricant may be introduced under pressure into the passages 76 and 78. The pin 62 is undercut at the center thereof in order to permit the flow of lubricant therearound. Thus, the lubricant introduced through the fitting 80 is effective to lubricate both the pin 162 for facilitating the movement of the lever 66 and, the space between the plate 72 and the cup 44 in order to facilitate the turning of the valve plug.

The cup 44 is provided with the flat sided portion 82 so that a wrench may be attached thereto in order to adjust the tension of the spring 50 thereby to vary the thrust which urges the valve plug downwardly in the bore 18.

It will be apparent that my improved structure lends itself to facility of inspection and replacement of parts so that the maintenance thereof is relatively simple of accomplishment. It will also be apparent that the cam portions 64 as well as the plate 72 could be made of hardened materials so that the wear thereon would be reduced to a minimum. Likewise, the upstanding flange 74 of the cup 44 could be a hardened surface in order to reduce wear and friction.

It will be understood that I desire to comprehend within my invention such modifications as may come within the scope of the claims and the invention.

I claim:

1. The combination in a plug cock valve which has a valve body in which is a passage controlled by a rotatable valve member having a stem of a means for lifting and rotating said stem and said plug comprising a hub disposed around said stem and rigid with said valve body, a collar attached to said stem and comprising stop lugs adapted for cooperation with corresponding lugs on said hub, a member adjustably retained in said hub, a spring bearing between said member and said collar for urging said valve member downwardly, cam means associated with said stem and adapted for engaging the upper surface of said member, and normally vertical lever means associated with said cam means whereby when said lever means is moved into a horizontal position for rotating said valve plug, said cam means is effective to lift said valve plug from its seat thereby to facilitate said turning.

2. In combination in a plug valve, a valve body having a main flow passage and a conical bore intersecting said passage, a conical valve plug having a transverse bore adapted to be rotatably received within said conical bore, a cap plate for closing said valve and for retaining said plug in position, a shouldered stem on said plug extending outwardly through said cap plate, said cap plate comprising an upstanding portion which includes a hub encircling said stem, said hub being adapted for screw threadedly receiving a cup member, a compression spring within said cup member, a shouldered collar abutting the shoulder on said stem and attached to said stem and comprising stop lugs adapted for cooperation with similar lugs on said hub, a transverse pin in the upper end of said stem, a pair of cam members adapted to be mounted on opposite ends of said pin, a bifurcated lever adapted to be attached to said cam members, and a wear plate disposed between said cam members and the top of said cup member whereby said lever may be rotated about said pin to lift said valve plug from its seat, may thereafter rotate said valve plug and thereafter be rotated about said pin to permit said valve plug to be urged downwardly against its seat by said spring.

3. A lift mechanism for a plug cock valve comprising a valve body having a yoke, said valve body having a passage therein controlled by a rotatable plug having a stem extending through said yoke, yielding means for continuously urging said stem and plug downwardly, said yielding means being located in an inverted cup-shaped member in said yoke, said member having an outer flat bottom surface, said surface being surrounded by an upwardly and outwardly extending annular flange, a rotatable washer mounted on said flange to form a space between said flange and said washer, said stem extending through said cup, a pair of rotatable spaced cams on opposite sides of said stem and carried by said stem above said rotatable washer and in abutting relationship therewith, means attached to said rotatable cams for rotating said cams to lift said plug against the thrust of said yielding means and for rotating said plug from one position to another, said cams and said stem having transverse bores, said bores receiving a pin member rotatably secured in said stem and non-rotatably secured in said cams, said stem having a longitudinal bore intersecting said bore in said stem and receiving a lubricant fitting at its outer end, said pin member having a reduced portion at the intersection of said bores to permit a lubricant from said fitting to flow therearound, said stem having passages extending from its longitudinal bore to said space to provide continuous communication with said space between said washer and said cup-shaped member whereby lubricant is supplied to said pin and to said space throughout the rotation of said cams.

OYSTEIN JACOBSEN.

REFERENCES CITED

The following references are of record in the file of this patent:

UNITED STATES PATENTS

| Number | Name | Date |
|---|---|---|
| 1,848,369 | Mohr | Mar. 8, 1932 |
| 2,139,632 | Flodin | Dec. 6, 1938 |
| 2,222,626 | Mueller | Nov. 26, 1940 |

FOREIGN PATENTS

| Number | Country | Date |
|---|---|---|
| 88,855 | Sweden | Mar. 23, 1937 |
| 683,662 | Germany | Nov. 11, 1939 |